(No Model.)
J. W. YATES & S. I. BAILOR.
ROAD SCRAPER.
No. 388,944. Patented Sept. 4, 1888.
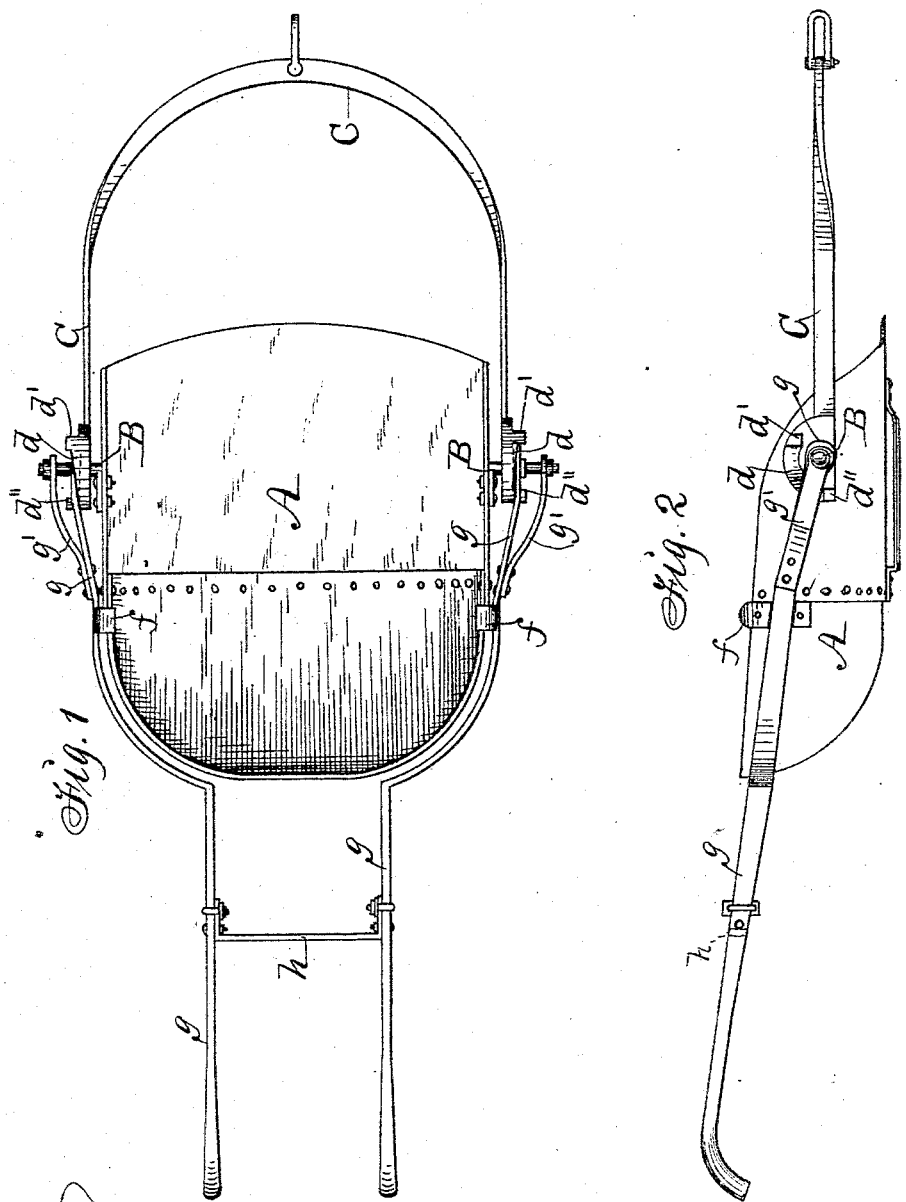

UNITED STATES PATENT OFFICE.

JOHN W. YATES AND SILAS I. BAILOR, OF GENEVA, NEBRASKA.

ROAD-SCRAPER.

SPECIFICATION forming part of Letters Patent No. 388,944, dated September 4, 1888.

Application filed April 27, 1888. Serial No. 272,082. (No model.)

*To all whom it may concern:*

Be it known that we, JOHN W. YATES and SILAS I. BAILOR, citizens of the United States of America, and residents of Geneva, in the county of Fillmore and State of Nebraska, have invented new and useful Improvements relating to Road-Scrapers, of which the following is a specification.

Our object is to lessen the manual labor incident to operating a revolving scraper, and to unload as well as to load and move ground by means of horse-power.

Our invention consists in the construction and combination of a bail, handles, and automatic latching mechanism, with a revolving scoop, as hereinafter set forth, pointed out in our claims, and illustrated in the accompanying drawings, in which—

Figure 1 is a top view, and Fig. 2 a side view, showing the construction and application of our latching devices with the bail, handle, and scoop, as required for practical use.

A represents a metal scoop of common form.

B B are stub axles fixed to the opposite sides and front portion of the scoop by means of rivets.

C is a bail made of wrought-iron and hinged to the stub-axles. The ends of the bail are enlarged and perforated to allow the axles to extend through.

$d$ represents wedge-shaped cams that terminate in stops $d'$, formed on or fixed to the outside faces and top portions of the perforated end of the bail. $d''$ represents stops on the lower parts of the same faces.

$f\ f$ are catches in the form of metal bars, that have inwardly-inclined and tapering top ends riveted to the outside and rear portion of the scoop A, to project above the scoop in such a manner that they will serve as cams to spread the handles when they are to be latched fast to the scoop. Transverse grooves in the outside faces of the lower portions of the bars admit the handles and retain them, as required, to lift the rear end of the scoop by means of the handles.

$g\ g$ are elastic metal handles pivoted to the stub-axles B and bent to conform to the shape of the rear portion of the scoop. They are connected by means of a flexible bar, $h$, that is adjustably fixed thereto by means of screwbolts and clips in such a manner that the bar will serve as a brace and also perform the function of a spring in drawing the handles into the grooves of the catches $f$, as required, to latch the pivoted handles fast to the scoop, so that the scoop can be raised at its rear end by means of the handles.

$g'$ represents branches fixed to the front ends of the pivoted handles to re-enforce them and to increase their bearing-surface on the axles B and to perform the functions of springs in maintaining tight joints between the overlapping ends of the handles and the ends of the bail pivoted to the axles B. Washers and keys on the outer ends of the stub-axles secure the handles and bail jointly, as required, to retain them on the axles.

In the practical operation of our improved scraper, when horses are hitched to the bail, the scoop is readily governed by means of handles, as required, to fill it with ground as the horses are advanced. To dump a load from the scoop, we simply lift the rear end of the scoop by means of the handles while the horses are advancing, and allow the front edge of the scoop to enter the ground, so that the draft of the horses, aided by the lifting force of the operator, will cause the rear end of the scoop to rise and the handles to slip forward over the cams $d$, to be thereby pressed outward and released from the catches $f$, so that the scoop when thus automatically unlatched from the handles will revolve forward and dump its contents, while the operator retains hold of the handles. A reverse movement of the empty scoop latches it fast again to the handles and places the scraper in readiness to be again advanced and filled. The stops $d'$ and $d''$ on the faces of the ends of the bail C and on the opposite sides of the pivoted ends of the handles $g$ engage the edges of the handles and restrict their movements relative to the bail.

We claim as our invention—

1. The bail C, having the cam $d$ and stops $d'$ and $d''$, in combination with a scoop having stub-axles B and fixed latch devices $f$ and handles $g$, substantially as shown and described, for the purposes stated.

2. The spring-bar $h$, in combination with the handles $g$, axle B, bail C, having cams on its ends, and latches $f$, for the purposes stated.

3. The re enforcing pieces or springs $g'$, in combination with the handles $g$ and the bail C on the axles B, substantially as shown and described, for the purposes stated.

4. An improved revolving scraper comprising a scoop having fixed stub-axles at its front, fixed catch devices at its opposite sides and rear portions, a bail having perforated ends, and cams and stops on the outside faces of the said ends, and handles pivoted to the stub-axles and connected with each other in rear of the scoop by a spring-bar, arranged and combined to operate in the manner set forth, for the purposes stated.

JOHN W. YATES.
SILAS I. BAILOR.

Witnesses:
D. H. CONANT,
J. M. SHICKLEY.